UNITED STATES PATENT OFFICE.

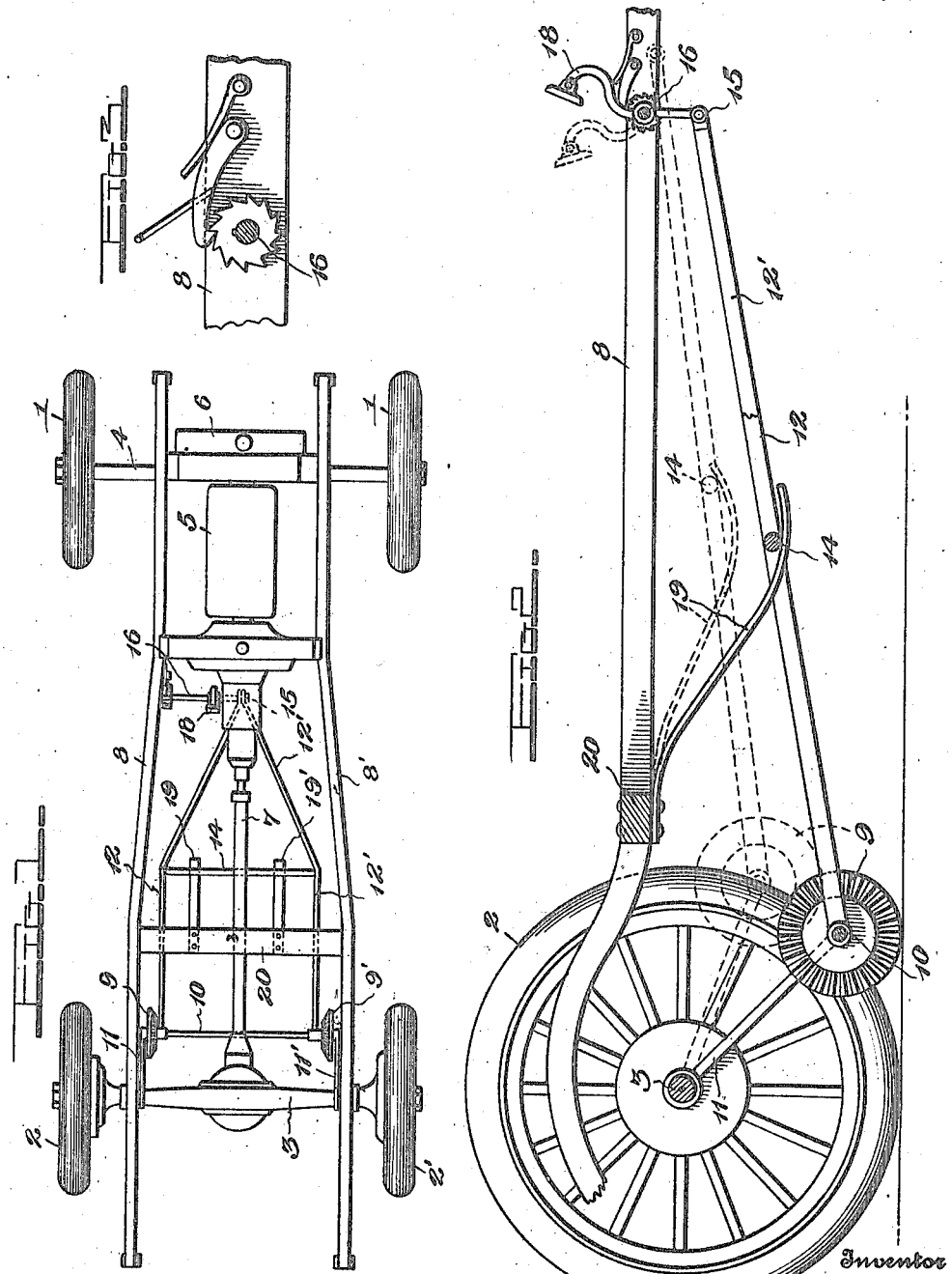

THOMAS O'DOWD, OF WARREN, OHIO.

ANTISKIDDING AND BRAKING DEVICE FOR AUTOMOBILES.

1,216,597.      Specification of Letters Patent.    Patented Feb. 20, 1917.

Application filed October 20, 1916. Serial No. 126,672.

*To all whom it may concern:*

Be it known that I, THOMAS O'DOWD, a citizen of the United States of America, residing at Warren, in the county of Trumbull and State of Ohio, have invented certain new and useful Improvements in Antiskidding and Braking Devices for Automobiles, of which the following is a specification.

My invention relates to improvements in devices for preventing the skidding or sliding sidewise of the rear wheels of automobiles, together with means for braking or retarding the forward movement of the automobile while the improved device is in operative position; and the objects of my invention are, first, to provide a mechanism operable at will by the chauffeur, which will tend to retain the rear wheels in the line of travel when turns are made or when roads are muddy or slippery; and, second, to minimize the accidents, consequent injuries and destructive results now attendant upon such skiddings.

Further objects and the utilities of my invention will appear in the specification; will be clearly set forth in my claim and be fully illustrated in the drawings, in which Figure 1 is a horizontal projection or plan of an automobile chassis in outline with my invention attached thereto.

Fig. 2 is an elevation showing (enlarged) a part of the left rear end of the chassis and the left rear wheel with my invention attached; said view being partly in section in parts broken away.

Fig. 3 shows an enlarged view of a locking device for holding my improvement in operation.

Similar characters refer to like parts throughout the several views, in which 1, 1, represent the front wheels of an automobile; 2 represents the left rear wheel and 2' the right rear wheel; 3 the rear axle; 4 the front axle; 5 the motor; 6 the cooling means; 7 the driving shaft; 8 and 8' the side bars of the chassis; 9 and 9' represent a pair of disks preferably beveled inwardly to produce cutting edges on their outside peripheries, and located between and respectively near to and in parallel vertical planes with rear wheels 2 and 2'.

Said disks 9 and 9' may be located at the extremities of an independent axle 10 parallel to the rear axle 3 and may be pivotally and strongly attached to said axle 3 by supporting arms 11, 11' as illustrated, or by any mechanical equivalent.

The axle 10 is rotatively pivoted through and supported by a pair of bars 12, 12', which may well be made parallel for a distance to a cross rod 14, as shown, and then bent angularly to unite at a pivot 15; or they may be straight and meet the axle 10 at an acute angle when more convenient.

Connecting the side bars 8, 8' of the chassis of an automobile there is always a rigid member 16, whether a rod (as shown) or a solid floor portion as may be. To said member 16 I pivotally attach a foot lever 18 within convenient reach of the chauffeur, fulcrumed on said member 16 and attached pivotally at its lower end to the pivot 15 and thereby operating with bars 12, 12' and the rest of the mechanism above described.

The lever 18 may be locked in its upright or operative position by any kind of spring snap or automatic lock, and I have illustrated a very simple device for the purpose in Fig. 3, comprising a well known form of pawl and ratchet.

In Fig. 2 my invention is shown by full lines when in operative position and by broken lines as when not in use.

In order to retain my device up away from the ground when not required for service, I have illustrated a pair of flat springs 19, 19', rigidly attached at one end to a cross bar 20 extending horizontally from side bar 8 to bar 8', and lying under rod 14 at their free ends. Said springs normally hold the disks 9, 9' up from the ground but yieldingly permit of the lowering thereof when the rod 14 is lowered by the operation and forward movement of the foot lever 18.

In practice the pushing forward of the lever 18 by the operator's foot forces the disks to the ground as is mechanically apparent without need of detailed elaboration.

The shape of the disks produces a tendency to have either one dig into the ground should the automobile slide or skid toward its side, and thereby stop or at least retard and minimize side movements, as well as serving as drags or brakes to slow down or retard the forward movement of the automobile to a certain useful extent.

I have so described and illustrated my invention that any one skilled in the art can therefrom make and adapt one to any automobile or other vehicle, and it is apparent that any of numerous well known mechanical equivalents of its various members may be substituted without departure from the invention.

It is also apparent that in practice the members can be made much more solid and substantial than as shown, and can be braced and supported in many ways. I have therefore omitted such mechanical necessities in order to present the invention in most simple and clear lines and construction, with avoidance of confusion of lines unnecessary for descriptive purpose.

I claim:—

Means for retaining the rear wheels of a vehicle in its line of travel, comprising a plurality of disks in vertical planes parallel to the planes of said wheels, in combination with a subsidiary axle therefor; a supporting frame for said axle pivoted in front of it; springs to normally hold said axle and disks off from the road; bars connecting said axle's ends and the fulcrum of an operating lever; a lever and a lever lock, for the purpose set forth and as shown and described.

In testimony whereof I affix my signature in presence of two witnesses.

THOMAS O'DOWD.

Witnesses:
 MARY L. RICE,
 P. BETHUNE.